United States Patent
Yasuhara et al.

(10) Patent No.: US 6,402,658 B1
(45) Date of Patent: Jun. 11, 2002

(54) TOROIDAL TYPE CONTINUOUSLY VARIABLE TRANSMISSION

(75) Inventors: Shinji Yasuhara, Yamatokooriyama; Takao Tamagawa, deceased, late of Nara-ken; by Masako Tamagawa, legal representative, Sasayama; Kazuo Rokkaku, Kashiwara; Shoji Eguchi, Nara-ken; Yoshihiro Ono, Kashiwara; Masao Goto, Habikino, all of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/556,694

(22) Filed: Apr. 24, 2000

(30) Foreign Application Priority Data

Apr. 22, 1999 (JP) .............................. 11-114767
Apr. 26, 1999 (JP) .............................. 11-117932

(51) Int. Cl.[7] .......................... F16H 55/32; F16H 15/38
(52) U.S. Cl. .......................................... 476/73; 476/42
(58) Field of Search .................... 476/42, 73; 148/334; 384/912, 913

(56) References Cited

U.S. PATENT DOCUMENTS

| 3,929,523 | A | | 12/1975 | Kinoshi et al. | |
|---|---|---|---|---|---|
| 5,536,091 | A | | 7/1996 | Takata et al. | |
| 5,733,388 | A | * | 3/1998 | Kurebayashi et al. | 148/334 |
| 5,735,769 | A | * | 4/1998 | Takemura et al. | 476/73 X |
| 5,908,515 | A | * | 6/1999 | Goto et al. | 148/334 |
| 5,976,053 | A | * | 11/1999 | Kino et al. | 476/73 |
| 6,066,068 | A | * | 5/2000 | Takemura et al. | 384/912 |
| 6,176,806 | B1 | * | 1/2001 | Okubo et al. | 476/73 |

FOREIGN PATENT DOCUMENTS

| GB | 802457 | | 10/1958 |
|---|---|---|---|
| GB | 2 337 271 A | | 11/1999 |
| JP | A-3253542 | | 11/1991 |
| JP | 6-117520 A | * | 4/1994 |
| JP | B2-2724019 | | 3/1998 |
| JP | 10237588 | | 9/1998 |

* cited by examiner

Primary Examiner—Rodney H. Bonck
(74) Attorney, Agent, or Firm—Troxell Law Office PLLC

(57) ABSTRACT

A continuously variable transmission including discs made of heat-resisting bearing steel, and rollers made of ceramics. The heat-resisting bearing steel contains 0.8–1.5 wt % of C, 0.5–2.0 wt % of Si, 0.3–2.0 wt % of Mn, 1.3–1.98 wt % of Cr, and 0.3–1.0 wt % of Mo, (Si+Mo) being 1.0 wt % or more. Because the rollers are made of ceramics superior in heat resistance, the toroidal type continuously variable transmission, even if used under high load and high rotational speed, is free from occurrence of sticking between discs and rollers and damage of the raceway surfaces.

6 Claims, 2 Drawing Sheets

TOROIDAL TYPE CONTINUOUSLY VARIABLE TRANSMISSION

BACKGROUND OF THE INVENTION

The present invention relates to a toroidal type continuously variable transmission to be used for, for example, automatic transmissions of automobiles.

Conventionally, there has been a toroidal type continuously variable transmission shown in FIG. 2. In this toroidal type continuously variable transmission, a first input disc 81, an output disc 82 and a second input disc 83 are coaxially arranged in this order. The first and second input discs 81, 83 and the output disc 82 rotate independently of each other. This transmission also has a first roller 85 and a second roller 86. The first roller 85 for transmitting power from the first input disc 81 to the output disc 82 is sandwiched between the first input disc 81 and the output disc 82. The second roller 86 for transmitting power from the second input disc 83 to the output disc 82 is sandwiched between the second input disc 83 and the output disc 82.

The first roller 85 rotates about a rotating shaft 84, an axis of which is crossing the rotating shaft of the two discs 81, 82, while keeping in frictional contact with circumferential raceways 81A, 82A formed of concavely curved surfaces of the first input disc 81 and the output disc 82, respectively. Thereby, the first roller 85 transmits power from the first input disc 81 to the output disc 82. Also, the second roller 86 rotates about a rotating shaft 89, an axis of which is crossing the rotating shaft of the two discs 83, 82, while keeping in frictional contact with circumferential raceways 83A, 82A formed of concavely curved surfaces of the second input disc 83 and the output disc 82, respectively. Thereby, the second roller 86 transmits power from the second input disc 83 to the output disc 82.

As shown by solid line or one-dot chain line in FIG. 2, the larger an angle at which the rotating shafts 84, 89 of the first and second rollers 85, 86 are tilted from a posture axially perpendicular to the shafts of the discs 81, 82, 83, the larger a speed increasing ratio (speed reduction ratio) from the first, second input discs 81, 83 to the output disc 82.

In the above conventional toroidal type continuously variable transmission, it has been practiced to make the discs and the rollers from a high carbon bearing steel (for example, Japanese Industrial Standards (JIS) G4805 SUJ2).

However, in the toroidal type continuously variable transmissions, contact portions between discs and rollers undergo a strict lubricating condition of boundary lubrication, and temperatures of the discs and the rollers easily become high when the discs and the rollers spin and/or slide. As a result, the toroidal type continuously variable transmissions have had a drawback that lifetime of the discs and the rollers is short.

Also in the toroidal type continuously variable transmission, a pressure on contact surfaces between the discs and the rollers becomes high, for example, as much as about 4 GPa (gigapascal). Therefore, when lubricating oil is not sufficiently supplied to between the discs and the rollers because of high viscosity of the lubricating oil particularly at a low temperature (for example −40° C.), an oil film is hardly formed between contact surfaces of the discs and the rollers. As a result, there has been a drawback that sticking between the discs and the rollers easily occur and/or damage of the disc raceway surfaces occur in the toroidal type continuously variable transmission.

SUMMARY OF THE INVENTION

An object of the present invention is therefore to provide a toroidal type continuously variable transmission which is superior in heat resistance and long in life, capable of preventing sticking between discs and rollers as well as damage of raceway surfaces even under low-temperature conditions or high-speed rotations, and thus achieving reliable power transmission at all times.

In order to achieve the above-mentioned object, the present invention provides a toroidal type continuously variable transmission including at least one input disc having a raceway of a concavely curved surface in a radial direction of one side of the input disc, an output disc having a raceway of a concavely curved surface in a radial direction of one side of the output disc placed in opposition to the raceway of the input disc, and a roller transmitting a power from the input disc to the output disc while keeping in frictional contact with both the raceway of the input disc and the raceway of the output disc, wherein at least one of the disc and the roller is made of a heat-resisting bearing steel which contains: C of both 0.8 wt % or more and 1.5 wt % or less; Si of both 0.5 wt % or more and 2.0 wt % or less; Mn of both 0.3 wt % or more and 2.0 wt % or less; Cr of both 1.3 wt % or more and 1.98 wt % or less; Mo of both 0.3 wt % or more and 1.0 wt % or less; a total of Si and Mo being 1.0 wt % or more; and the residual compositions being composed of iron and unavoidable impurities.

In an embodiment of the invention, the input disc, the output disk and the roller are made of the heat-resisting bearing steel.

According to the above embodiment, it has been found out that by making the discs and the roller of the toroidal type continuously variable transmission from the heat-resisting bearing steel having the above composition, high-temperature strength and hardness of the discs and the roller can be ensured, allowing longer life to be achieved as compared with the case in which the discs and the roller are made of high carbon bearing steel (JIS G4805 SUJ2).

For the heat-resisting bearing steel to be used in the present invention, the reasons for limiting composition ranges of its alloy components are given below:

C: At least 0.8 wt % C is necessary in order to reinforce martensite with C dissolved into a base metal and assure hardness of the steel after tempering as well as improve the rolling fatigue life characteristic. However, too large amounts of C cause enormous carbides to be generated, resulting in deterioration of the rolling fatigue life characteristic, hence an upper limit of C is 1.5 wt %;

Si: At least 0.5 wt % Si is necessary in order to particularly contribute to the suppression of hardness degradation after tempering, under the interaction of Si dissolved into a base metal with later-described Mo, as well as act as a deoxidizer in making a steel ingot. However, too large amounts of Si considerably deteriorate machinability and forgeability, hence an upper limit of Si is 2.0 wt %, but less than 1.0 wt % Si is more preferable;

Mn: At least 0.3 wt % Mn is necessary in order to enhance the toughness of martensite in base metal and improve the hardness and rolling fatigue life of steel material by improving the hardenability of steel. However, too large amounts of Mn considerably deteriorate the machinability, hence an upper limit of Mn is 2.0 wt %;

Cr: At least 1.3 wt % Cr is necessary in order to form a carbide and to improve high-temperature rolling fatigue life characteristic of steel. However, too large amounts of Cr cause the hardness after tempering to be deteriorated so that the high-temperature rolling fatigue life is conversely deteriorated, hence an upper limit of Cr is 1.98 wt %;

Mo: At least 0.3 wt % of Mo is necessary and more preferably 0.5 wt % of Mo is necessary in order to allow dissolution into a base metal and thereby improve the hardness after tempering and the rolling fatigue life characteristic. However, too large amounts of Mo block those effects from being exhibited while leading to an increased cost, hence an upper limit of Mo is 1.0 wt %;

Si+Mo: 1.0 wt % or more is necessary in order to obtain superior hardness and high-temperature rolling fatigue life characteristic after high-temperature tempering.

In an embodiment of the invention, the input disc and the output disc are made of the heat-resisting bearing steel, and the roller is made of ceramics.

According to the above embodiment, in the toroidal type continuously variable transmission of this invention, the roller made of ceramics and the discs made of the heat-resisting bearing steel rotate while keeping in frictional contact with each other. High heat is generated between the discs and the roller by this frictional contact. The rollers having smaller surface areas become higher in temperature than the input/output discs having larger surface areas which easily release heat. However, since ceramics superior in heat resistance are used for the rollers in this invention, even if the toroidal type continuously variable transmission is used under high load and/or high rotational speed, sticking between discs and roller or damage of raceway surfaces does not occur. Furthermore, even if enough oil is not supplied to between the disc and the roller due to an extremely low service temperature, the discs and the roller are unlikely to undergo seizure or damage, and thereby this transmission securely transmits a power at all times.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinbelow, the present invention is described in detail by way of embodiments thereof illustrated in the accompanying drawings.

Figure 1:
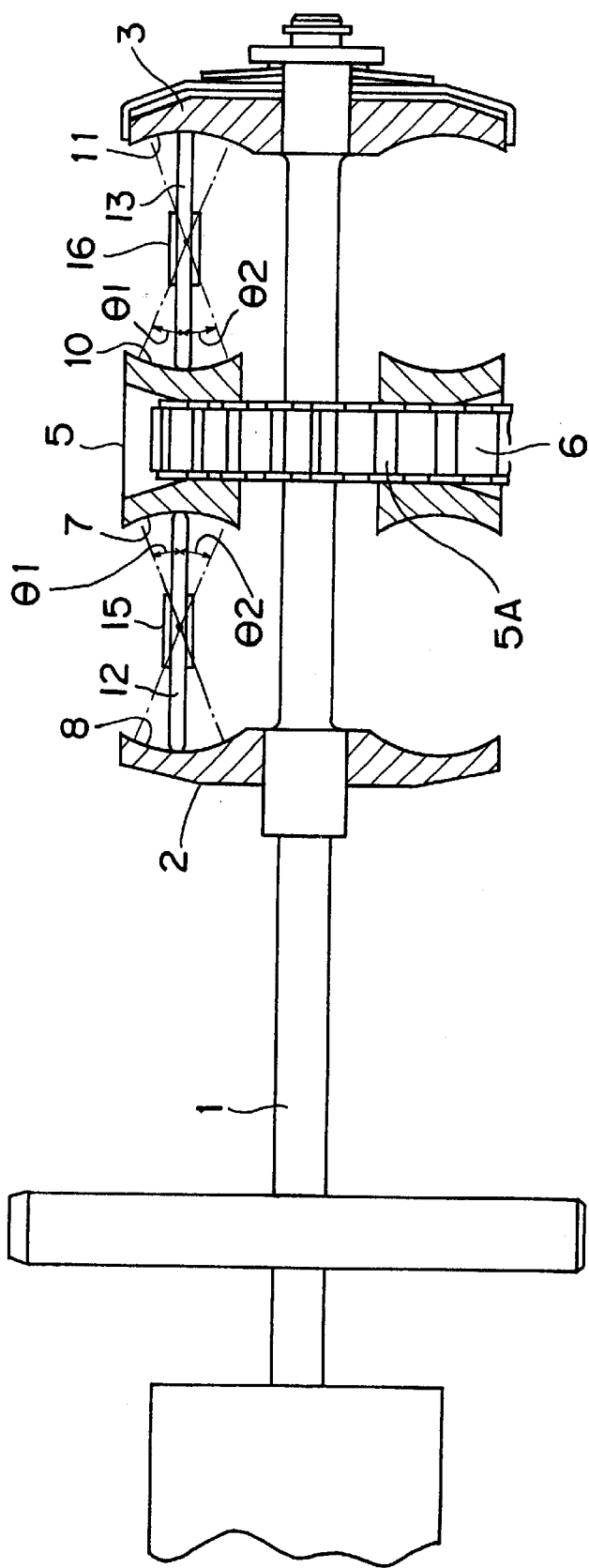
FIG. 1 is a partial sectional view showing a first embodiment and a second embodiment of the toroidal type continuously variable transmission according to the present invention.
Figure 2:
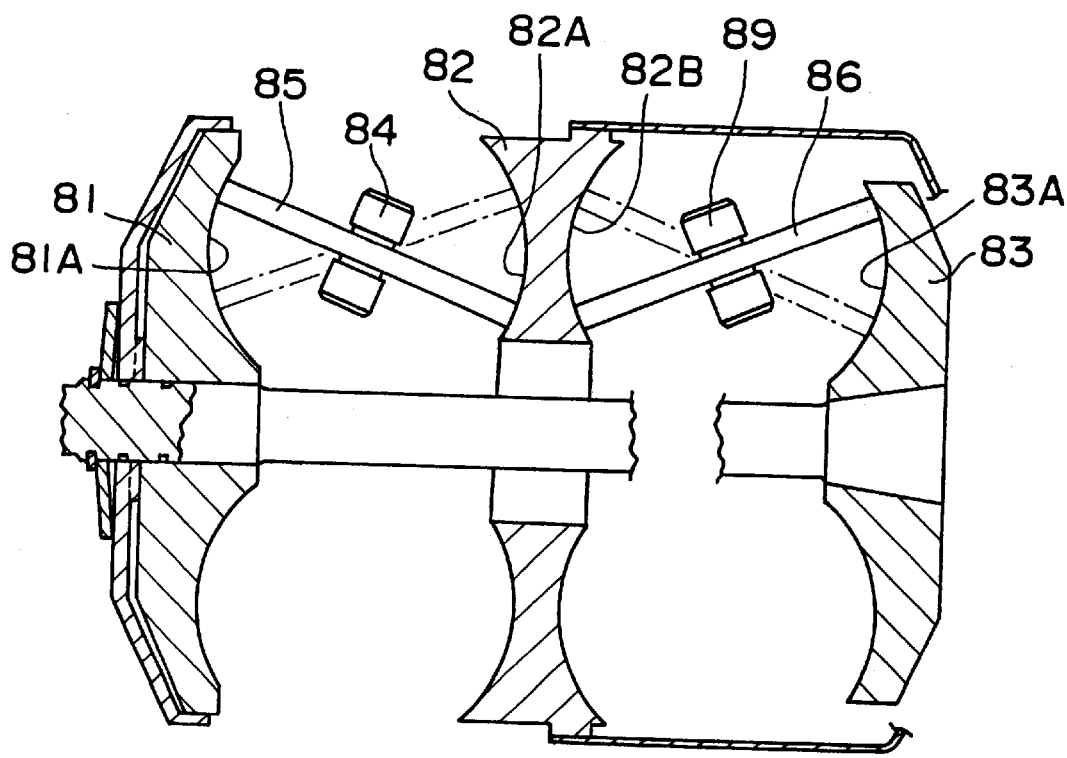
FIG. 2 is a partial sectional view showing a toroidal type continuously variable transmission according to the prior art.

FIG. 1 shows a first embodiment of a toroidal type continuously variable transmission according to the present invention. In this first embodiment, the toroidal type continuously variable transmission has first, second input discs 2, 3 fixed to an input shaft 1, and has an output disc 5 placed between the first, second input discs 2, 3 and rotatable coaxially with and independently of the first, second input discs 2, 3. This output disc 5 is rotatably supported on the input shaft 1 by a bearing (not shown) so that power is taken out onto an output side with a belt 6 wound on a gear portion 5A.

The first input disc 2 has a circumferential raceway 8 formed into a concavely curved surface and opposite to a circumferential raceway 7 of the output disc 5 formed into a concavely curved surface, while the second input disc 3 has a circumferential raceway 11 formed into a concavely curved surface and opposite to a circumferential raceway 10 of the output disc 5 formed into a concavely curved surface. A first roller 12 is disposed between the raceway 8 of the first input disc 2 and the raceway 7 of the output disc 5, while a second roller 13 is disposed between the raceway 11 of the second input disc 3 and the raceway 10 of the output disc 5. The first roller 12 rotates while keeping in frictional contact with the raceways 8, 7 of the discs 2, 5, thereby transmitting rotational power from the input disc 2 to the output disc 5. The second roller 13 rotates while keeping in frictional contact with the raceways 11, 10 of the discs 3, 5, thereby transmitting rotational power from the input disc 3 to the output disc 5.

The first, second rollers 12, 13 have rotating shafts 15, 16 respectively, the axes of which cross the input shaft 1. These rotating shafts 15, 16 are controlled so as to have symmetrical tilt angles θ1, θ2 with the output disc 5 therebetween. As the tilt angle θ1 becomes large, the speed reduction ratio decreases; and as the tilt angle θ2 becomes large, the speed increasing ratio decreases.

In this first embodiment, the input discs 2, 3, the output disc 5, and the first, second rollers 12, 13 are made of heat-resisting bearing steel. This heat-resisting bearing steel contains carbon (C) at a range of 0.8–1.5 wt %, silicon (Si) at a range of 0.5–2.0 wt %, and manganese (Mn) at a range of 0.3–2.0 wt %. This heat-resisting bearing steel also contains chromium (Cr) at a range of 1.3–1.98 wt %, and molybdenum (Mo) at a range of 0.3–1.0 wt %, Si and Mo satisfying that their total content is 1.0 wt % or more, and the rest of the composition being composed of iron and unavoidable impurities.

In the toroidal type continuously variable transmission of the above constitution, as the input shaft 1 rotates, the first and second input discs 2, 3 rotate along therewith. These input discs 2, 3 rotate the rollers 12, 13 in frictional contact with the raceways 8, 11 of the input discs 2, 3. The rollers 12, 13 rotate the output disc 5 in frictional contact with the two raceways 7, 10 of the output disc 5. Thereby, a rotational power of the shaft 1 is transmitted to the output disc 5.

In this toroidal type continuously variable transmission, it was able to be confirmed by experiments that the discs 2, 3, the disc 5 and the rollers 12, 13 made of the heat-resisting bearing steel of the foregoing composition can ensure high-temperature strength and hardness of the discs 2, 3 and the disc 5, and thereby longer life can be achieved than those made of high carbon bearing steel (JIS SUJ2).

More specifically, the heat-resisting bearing steel, because of its C content being 0.8 wt % or more, is enabled to ensure hardness after tempering and to improve rolling fatigue life characteristic. The heat-resisting bearing steel, because of its C content being 1.5 wt % or less, is enabled to suppress the generation of enormous carbides and thus to avoid deterioration in rolling fatigue life.

Also, this heat-resisting bearing steel, because of its Si content being 0.5 wt % or more, is enabled to act as a deoxidizer in making a steel ingot, and besides to dissolve into a base metal and thereby contribute particularly to the suppression of hardness degradation after tempering under the interaction with later-described Mo. Furthermore, because of the Si content being 2.0 wt % or less, machinability and forgeability of the heat-resisting bearing steel is not impaired.

Further, this heat-resisting bearing steel, because of its Mn content being 0.3 wt % or more, is enabled to improve the hardenability of steel, to enhance the tenacity of the martensite in base metal, and to improve hardness and rolling fatigue life of the steel material. Also, this heat-resisting bearing steel, because of its Mn content being 2.0 wt % or less, is free from deterioration in machinability.

Also, this heat-resisting bearing steel, because of its Cr content being 1.3 wt % or more, is enabled to form a carbide and thereby to improve the high-temperature rolling fatigue life. Also, this heat-resisting bearing steel, because of its Cr content being 1.98 wt % or less, is enabled to avoid hardness degradation after tempering and thus to improve the high-temperature rolling fatigue life.

Furthermore, this heat-resisting bearing steel, because of its Mo content being 0.3 wt % or more, is enabled to improve the hardness after tempering as well as rolling fatigue life, and because of its Mo content being 1.0 wt % or less, is enabled to suppress cost increase.

Also, this heat-resisting bearing steel, because of its total content of Si content in wt % and Mo content in wt % being 1.0 wt % or more, is enabled to obtain excellent hardness and high-temperature rolling fatigue life characteristic after tempering.

In addition, in the above embodiment, the Si content in wt % has been set to 2.0 wt % or less in the composition of the heat-resisting bearing steel of which the discs 2, 3, the disc 5 and the rollers 12, 13 of the toroidal type continuously variable transmission are made. However, if the Si content is set to less than 1.0 wt %, deteriorations in machinability and forgeability can be avoided more securely.

Next, a second embodiment of the present invention is described with reference to FIG. 1 as in the first embodiment. Basic structure and functions of the toroidal type continuously variable transmission in the second embodiment are similar to those of the first embodiment. Therefore, their description is omitted for avoidance of overlaps.

The second embodiment differs from the first embodiment in a point that the first, second rollers 12, 13 are made of ceramic material. That is, in the second embodiment, the first and second rollers 12, 13 are made of ceramic material whereas the input discs 2, 3 and the output disc 5 are made of heat-resisting bearing steel.

In the toroidal type continuously variable transmission of the above constitution, as the input shaft 1 rotates, the first and second input discs 2, 3 rotate along therewith. The first and second input discs 2, 3 rotate the rollers 12, 13 in frictional contact with the raceways 8, 11 of these input discs 2, 3 respectively. The rollers 12, 13 rotate the output disc 5 in frictional contact with the two raceways 7, 10 of the output disc 5. Thereby, a rotational power of the input shaft 1 is transmitted to the output disc 5.

Whereas a toroidal type continuously variable transmission generates high heat due to high contact surface pressure (e.g., 4 GPa), the heat resistance of the rollers 12, 13 is further improved by using rollers 12, 13 made of ceramics. That is, seizure and damage are hardly made to occur by using the rollers 12, 13 made of ceramics superior in heat resistance and the discs 2, 3 and 5 made of heat-resisting bearing steel. Also, as in the case where the transmission is used under an environment at an extremely low temperature such as −40° C., even if enough amount of oil is not supplied to between the discs and rollers, sticking between the discs 2, 3, 5 and the rollers 12, 13 as well as damage of the raceways 8, 11, 7, 10 can be prevented by virtue of the use of ceramics for the rollers 12, 13. Accordingly, the discs 2, 3, 5 and the rollers 12, 13 of the toroidal type continuously. variable transmission are enabled to transmit power securely at all times. That is, the toroidal type continuously variable transmission can be used under high load and/or high rotational speed. Further, since seizure hardly occurs to the rollers, stirring resistance of oil can be suppressed by suppressing the oil amount to low, so that the efficiency of the toroidal type continuously variable transmission can be improved.

The invention being thus described, it will be obvious that the same may be varied in many ways. Such variations are not be regarded as a departure from the spirit and scope of the invention, and all such modifications as would be obvious to one skilled in the art are intended to be included within the scope of the following claims.

What is claimed is:

1. A toroidal type continuously variable transmission including at least one input disc having a raceway of a concavely curved surface in a radial direction of one side of the input disc, an output disc having a raceway of a concavely curved surface in a radial direction of one side of the output disc placed in opposition to the raceway of the input disc, and a roller transmitting a power from the input disc to the output disc while keeping in frictional contact with both the raceway of the input disc and the raceway of the output disc, wherein
    at least one of the disc and the roller is made of a heat-resisting bearing steel which contains:
        C of both 0.8 wt % or more and 1.5 wt % or less;
        Si of both 0.5 wt % or more and 2.0 wt % or less;
        Mn of both 0.3 wt % or more and 2.0 wt % or less;
        Cr of both 1.3 wt % or more and 1.98 wt % or less;
        Mo of both 0.3 wt % or more and 1.0 wt % or less;
        a total of Si and Mo being 1.0 wt % or more; and the residual compositions being composed of iron and unavoidable impurities.

2. The toroidal type continuously variable transmission as claimed in claim 1, wherein
    the input disc, the output disc and the roller are made of the heat-resisting bearing steel.

3. The toroidal type continuously variable transmission as claimed in claim 1, wherein
    the input disc and the output disc are made of the heat-resisting bearing steel, and the roller is made of ceramics.

4. A toroidal type continuously variable transmission comprising:
    a) a first input disc having a first concavely curved circumferential raceway;
    b) a second input disc having a second concavely curved circumferential raceway, the second input disc being coaxial with, and spaced from the first input disc;
    c) an output disc coaxial with the first and second input discs and located between the first and second discs, the output disc having a third concavely curved circumferential raceway facing toward the first concavely curved circumferential raceway and a fourth concavely curved circumferential raceway facing toward the second concavely curved circumferential raceway, and an output gear portion located between the third and fourth concavely curved circumferential raceways;
    d) a first roller located between and in frictional contact with the first and third concavely curved circumferential raceways; and,
    e) a second roller located between and in frictional contact with the second and fourth concavely curved circumferential raceways, wherein all of the first, second, and output discs are made of heat-resisting steel which contains:

C of both 0.8 wt % or more and 1.5 wt % or less;
Si of both 0.5 wt % or more and 2.0 wt % or less;
Mn of both 0.3 wt % or more and 2.0 wt % or less;
Cr of both 1.3 wt % or more and 1.98 wt % or less;
Mo of both 0.3 wt % or more and 1.0 wt % or less;
a total of Si and Mo being 1.0 wt % or more; and the residual compositions being composed of iron and unavoidable impurities.

5. The toroidal type continuously variable transmission as claimed in claim 4, wherein at least one of the first and second rollers is made of ceramic material.

6. The toroidal type continuously variable transmission as claimed in claim 4, wherein both the first and second rollers are made of ceramic material.

* * * * *